United States Patent [19]

Kawai et al.

[11] Patent Number: 4,822,093
[45] Date of Patent: Apr. 18, 1989

[54] VEHICLE SEAT WITH ROTATABLE BACKREST

[75] Inventors: Naoki Kawai, Nishio; Toshiaki Shimogawa, Okazaki; Satosi Kuwakado, Nukata; Koji Imai, Nukata; Toshikazu Ina, Nagoya; Akira Kuno, Obu, all of Japan

[73] Assignees: Nippondenso Co., Ltd., Kariya; Nippon Soken, Inc., Nishio, both of Japan

[21] Appl. No.: 66,540

[22] Filed: Jun. 26, 1987

[30] Foreign Application Priority Data

Jun. 27, 1986 [JP] Japan ................... 61-149711
May 18, 1987 [JP] Japan ................... 62-118981

[51] Int. Cl.⁴ .......................... B60N 1/04; B60N 1/06
[52] U.S. Cl. ........................... 296/65.1; 297/353
[58] Field of Search ............. 296/65 R; 291/353–355, 291/361, 383

[56] References Cited

U.S. PATENT DOCUMENTS

| 2,290,464 | 7/1942 | Buchheit et al. | 296/65 R |
| 2,587,679 | 3/1952 | Atkinson et al. | 296/65 R |
| 4,555,126 | 11/1985 | Ishimitsu et al. | 280/707 |
| 4,600,239 | 7/1986 | Gerstein et al. | 297/349 |
| 4,673,194 | 6/1987 | Sugasawa | 280/707 |
| 4,707,788 | 11/1987 | Tashiro et al. | 364/424 |

FOREIGN PATENT DOCUMENTS

| 3046049 | 7/1982 | Fed. Rep. of Germany | 297/417 |
| 178936 | 11/1982 | Japan | 296/65 R |
| 58-214423 | 12/1983 | Japan | |
| 0018529 | 1/1986 | Japan | 296/65 R |
| 61-18051 | 2/1986 | Japan | |

Primary Examiner—Dennis H. Pedder
Attorney, Agent, or Firm—Cushman, Darby & Cushman

[57] ABSTRACT

A vehicle seat comprising a horizontal seat cushion, a support shaft projecting upward from the seat cushion, and a rotatable backrest secured on the support shaft. The vehicle seat further comprises a mechanism for regulating the rotational movement of the backrest, which can be controlled in response to a detected driving state of the vehicle. The backrest may be immovably retained at a normal position relative to the seat cushion during the usual forward driving, and allowed to rotate to a suitable position during a stop, reverse, or cornering of the vehicle.

32 Claims, 19 Drawing Sheets

VEHICLE SEAT WITH ROTATABLE BACKREST

BACKGROUND OF THE INVENTION

1. Field of the Invention

The present invention relates to a vehicle seat. More specifically, the present invention relates to a vehicle seat having a rotatable backrest which can be solely rotated on a seat cushion when the vehicle is in reverse, when baggage is loaded on and off a rear seat from a front seat, or when the vehicle is cornering, for example.

2. Description of the Related Art

A conventional vehicle seat comprises a seat cushion upon which a driver or other passengers are seated and a backrest to support the back of the driver or other passengers, which backrest is tiltably supported at the seat cushion through a reclining adjusting mechanism. The seat cushion is slidable and can be moved back and forth relative to the floor of the vehicle. These mechanisms allow the driver to assume the most comfortable position and a passenger access to the rear seat by folding the backrest forward in the case of a two door automobile. Also, the driver can reach the rear seat by folding the backrest backward.

Proposals have been made, but not generally practiced, to provide a rotatable vehicle seat in which the seat cushion is rotatably mounted on the floor of the vehicle to make it easier to enter and exit from the vehicle (c.f., for example, U.S. Pat. Nos. 2,290,464, 2,587,679, and 4,600,239). In this case, the seat cushion must be immovably locked to the floor after the driver or other passenger is seated. In such a conventional vehicle seat, the backrest rotates together with the seat cushion, and it is impossible to rotate the backrest alone, relative to the seat cushion, about a vertical axis.

Of course, many rotatable seats and chairs for other purposes are known. For example, Japanese Unexamined Utility Model Publication (Kokai) No. 61-18051 discloses a Japanese type chair with a rotatable backrest.

Many advantages may be gained if a vehicle seat can be rotated about a vertical axis, such as when entering and exiting from the vehicle and when loading and unloading baggage from the rear seat while the driver is sitting on the front seat, as stated above. Further, it would be advantageous if the vehicle seat could rotate about the vertical axis during a certain running state of the vehicle. For example, the driver will be able to obtain a better and more comfortable view through the rear window when the vehicle is reversing, if the backrest is rotatable. However, the internal space of the vehicle is usually very restricted, and it is very difficult to arrange a vehicle seat rotatable about a vertical axis, with the exception of custom-built vehicles.

It will be almost impossible to directly mount an existing chair, for example, a chair with a rotatable backrest as disclosed in the above-described Kokai No. 61-18051 in the vehicle, for if such a seat with a freely rotatable backrest is mounted in a vehicle, problems will arise wherein the driver's position becomes unstable during a running state of the vehicle because the backrest can move freely and the driver's body will be allowed to turn when the vehicle is cornering.

SUMMARY OF THE INVENTION

An object of the present invention is to provide a vehicle seat with a backrest which can solve the above-described problems by allowing the backrest to rotate relative to the seat cushion.

The present invention provides a seat mounted in a vehicle, comprising a seat cushion for seating a person in the vehicle, a support shaft projecting upward from the seat cushion and having an axis, a backrest secured on the support shaft for rotation about the axis thereof, means for regulating the rotational movement of the backrest, means for detecting the driving state of the vehicle, and control means for controlling the regulating means in response to the detected state of the vehicle. The detecting means preferably comprises a shift position detecting means for detecting the shift position of a shift lever of a transmission and a speed detecting means for detecting the speed of the vehicle, and the rotational movement regulating means is arranged such that the backrest is immovably retained at a predetermined angular position relative to the seat cushion at least when the shift lever is in a forward drive position and the vehicle is running.

Preferably, the rotational movement regulating means is arranged such that the backrest is allowed to freely rotate within a predetermined range relative to the seat cushion when the shift lever is in a reverse position, or when the vehicle is detected to be stopped.

Preferably, the detecting means further comprises means for detecting a rotation indicating signal from a manual switch, and the rotational movement regulating means is arranged such that the backrest is rotated in the desired direction relative to the seat cushion when a stop of the vehicle and a rotation indicating signal from the manual switch are detected. Also, the detecting means further comprises a steering angle sensor or a transverse acceleration sensor, and the rotational movement regulating means is arranged such that the backrest is rotated by a predetermined angle relative to the seat cushion when the vehicle is running forward and cornering.

Preferably, the rotational movement regulating means comprises an engaging means adapted to engage with the support shaft or the backrest to regulate the rotational movement of the backrest and a drive means adapted to be controlled by the control means and to drive the engaging means.

In a preferred embodiment, the support shaft is rotatably mounted at the seat cushion and fixedly supports the backrest, and the engaging means engages with the rotatable support shaft. The engaging means is preferably releasably engaged with the support shaft, and thus the rotational movement regulating means immovably retains the backrest when the engaging means is engaged with the support shaft and allows the backrest to freely rotate within a predetermined range when the engaging means is released from the support shaft.

The engaging means preferably includes an engaging member movable to and from the support shaft on a radius line extending toward the axis of the support shaft, the engaging member having a notch or a detent projection complementary to a detent projection or a notch of the support shaft, the drive means linearly driving the engaging member on the radius line to cause the engaging member to be engaged with or released from the support shaft. The support shaft preferably has a detent projection and the engaging member has a complementary notch with a pair of ribs extending divergently toward the support shaft on either side of the notch, and thus the detent projection with the support shaft can freely rotate within a predetermined range limited by the ribs when the support shaft is released from the engaging member. In this embodiment, the drive means comprises a solenoid operated actuator, or a fluid pressure actuator.

Also in this embodiment, wherein the support shaft is rotatably mounted at the seat cushion and fixedly supports the backrest, the engaging means preferably comprises a geared wheel fixedly secured on the support shaft and connected to an electric motor which drives the geared wheel, whereby the engaging means can bring the backrest to various angular positions under the control of the control means and can immovably retain the backrest at a predetermined angular position when the shift lever is in a forward drive position. The backrest can be rotated by controlled angles relative to the seat cushion when the vehicle is cornering.

In another preferred embodiment of the invention, the support shaft rotatably supports the backrest and the rotational movement regulating means comprises an engaging means adapted to engage with the backrest to regulate the rotational movement of the backrest and a drive means adapted to drive the engaging means. The backrest preferably has a guide pin extending parallel to the support shaft and the engaging means comprises a pair of identical engaging wheels rotatably mounted on the support shaft at axially spaced positions and having respective identical arcuate through-slots. This guide pin is inserted through these arcuate through-slots, and the engaging wheels can be driven to positions such that the guide pin is pinched by one end of the arcuate through-slots to restrain the backrest. The pair of wheels can be synchronously driven in the same sense while maintaining the guide pin in the position at which it is pinched by one end of the arcuate through-slots, to draw the backrest to a desired angular position. The pair of wheels can be driven from a first position in which one end of the arcuate through-slots pinch the guide pin, to a second position in which the arcuate through-slots are superimposed one over the other to thereby form a clearance between the guide pin and the ends of the arcuate through-slots, to allow the backrest to freely rotate within a predetermined angular extent as defined by the circumferential length of the arcuate through-slots at that second position, or to allow the backrest to be brought to a desired position by the guide pin when engaged by one end of the arcuate through-slots when the wheels are driven to the second position.

In the further preferred embodiment, the pair of wheels are provided, on the circumferences thereof, with registrable detent projections or notches which can be brought to a consecutive unit position when one end of the arcuate through-slots pinches the guide pin, and the engaging means includes an engaging member movable to and from the support shaft on a radius line extending toward the axis of the support shaft, the engaging member having a notch or a detent projection complementary to the detent or the notch of the wheels, the drive means linearly driving the engaging member on the radius line to cause the engaging member to be engaged with or released from the wheels.

A spring means can be preferably provided to return the backrest to a predetermined initial position. The backrest also can be tiltably supported relative to the seat cushion through a conventional reclining adjusting mechanism.

BRIEF DESCRIPTION OF THE DRAWINGS

The present invention will be more fully understood from the following description of the preferred embodiments according to the present invention in reference to the accompanying drawings, in which.

DESCRIPTION OF THE PREFERRED EMBODIMENTS

Figure 1:
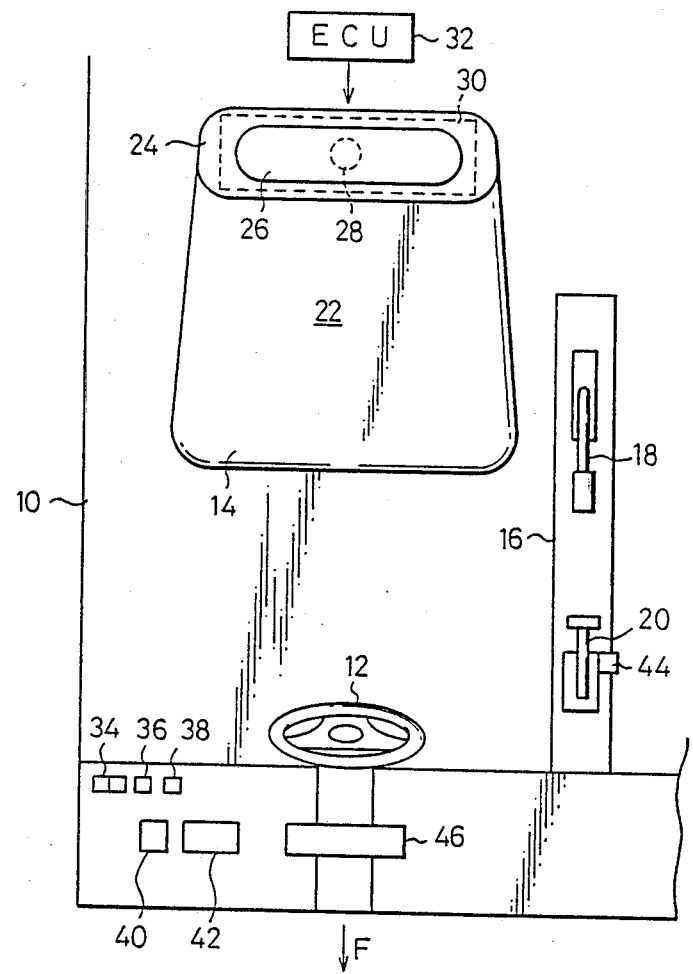
FIG. 1 is a plan view illustrating a front portion of a vehicle with a seat in accordance with a first embodiment of the present invention.
Figure 2A:
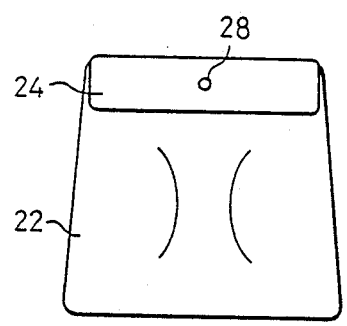
FIGS. 2A-2D are views illustrating the seat of FIG. 1 in a normal predetermined position and in rotated angular position.
Figure 2B:
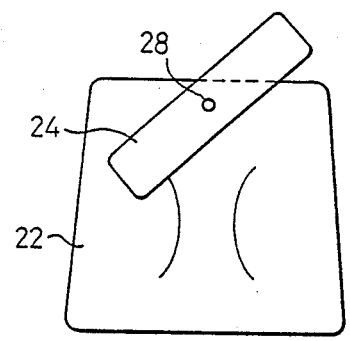
Figure 2C:
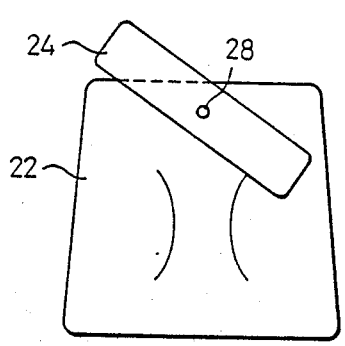
Figure 2D:
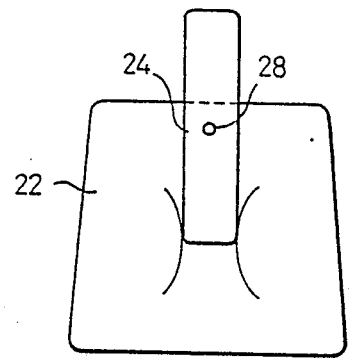

In the following description of the preferred embodiments and in the attached drawings, similar reference numerals are used to represent similar elements throughout the description.

FIG. 1 shows a front portion of a vehicle 10 according to the present invention, wherein an arrow F indicates the forward running direction of the vehicle 10. The vehicle 10 has a steering wheel 12 and a seat 14 for the driver. The vehicle 10 also has other seats but these are not shown. A console box 16 is provided between the seat 14 for the driver and another front seat, and a parking brake lever 18 and a transmission shift lever 20 are located in the console box 16.

The seat 14 comprises a generally horizontal seat cushion 22 for seating the driver, a backrest 24 provided at the rear of the seat cushion 22, and a headrest 26 mounted on the backrest 24. The backrest 24 is rotatably mounted on a support shaft 28, which projects upward from the seat cushion 22. An apparatus 30 for regulating the rotational movement of the backrest 24 is provided between the seat cushion 22 and the backrest 24. This apparatus 30 is controlled by an electric control unit (ECU) 32 in response to a state of the vehicle 10 so as to regulate an angular position of the backrest 24.

The electric control unit (ECU) 32 receives detection signals from sensors for detecting the state of the vehicle 10 and calculating the angular positions of the backrest 24. The following sensors are shown in FIG. 1. A manual switch 34 is located at the front of the driver's compartment near the door. This manual switch 34 can be operated by either the driver of the vehicle 10 or by a person outside of the vehicle 10, and 15 comprises a pair of right and left buttons. The backrest 24 can be turned to the left by predetermined angles, as shown in (B) of FIG. 2, by pushing the right button, and can be turned to the right by predetermined angles, as shown in (C) of FIG. 2, by pushing the left button. Adjacent to the manual switch 34 is a return switch 36, and the backrest 24 can be returned to the initial normal position, i.e., extending perpendicularly to the seat cushion 22 as shown in (A) of FIG. 2, and immovably retained at that position by pushing the return switch 36. Also, the backrest 24 can be turned to the position shown in (D) of FIG. 2, at which it is parallel to the seat cushion 22. Further, the backrest 24 can be brought to a released state in which it is freely rotatable, as described later, and an angular range selecting knob 38 is provided to select the acceptable limit of the angular range of the rotational movement of the backrest 24 when in a freely rotatable state.

An ignition switch 40 and an appropriately constructed speed sensor 42 are provided to detect the running state of the vehicle 10. Further, a shift position sensor 44 is provided to detect the position of the transmission shift lever 20. In the case of an automatic transmission, for example, the shift position sensor 44 can detect the running state of the vehicle as indicated by the shift positions D (drive), R (reverse), N (neutral), and P (parking). Further, a steering sensor 46 is provided and cooperates with the shaft of the steering wheel 12 to detect the steering angle.

Figure 3:
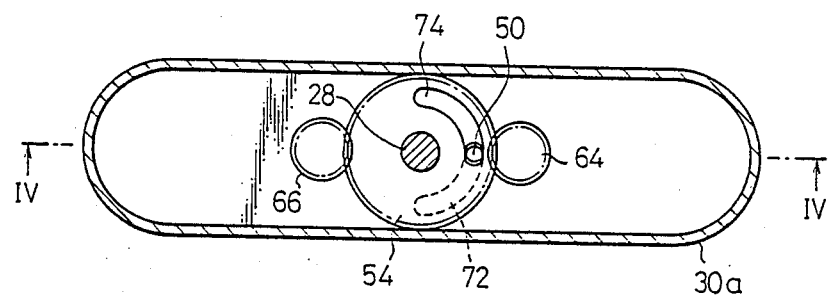
FIG. 3 is a detailed cross-sectional view of the rotational movement regulating apparatus for the seat of FIG. 1 taken along the lines III—III in FIG. 4.
Figure 4:
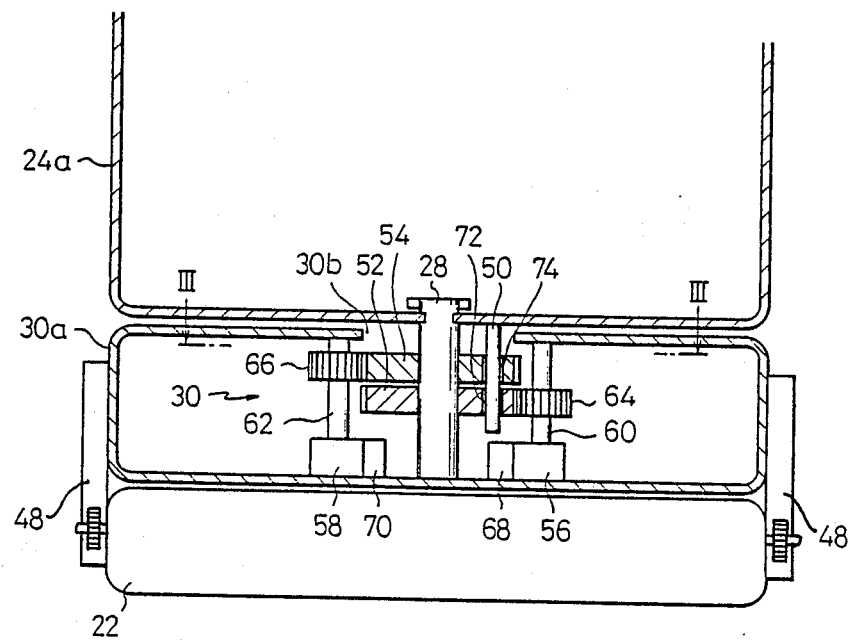
FIG. 4 is a cross-sectional view of the rotational movement regulating apparatus of FIG. 3, taken along the lines IV—IV in FIG. 3.
Figure 5A:
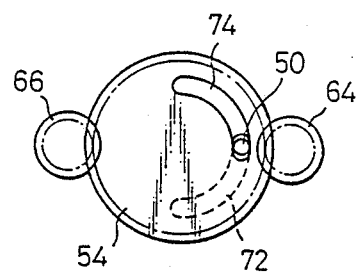
FIGS. 5A-5D are views illustrating the operation of the apparatus of FIGS. 3 and 4.
Figure 5B:
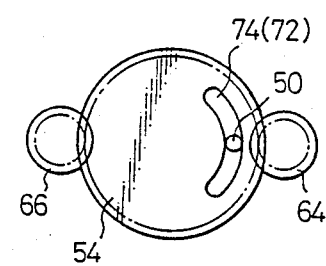
Figure 5C:
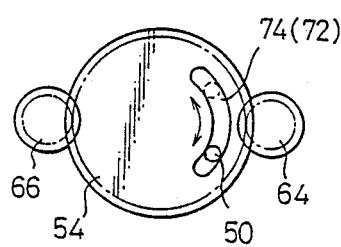
Figure 5D:
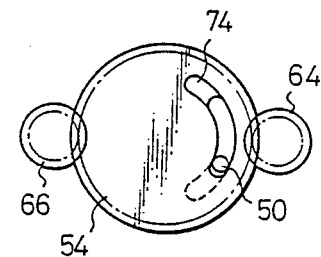
Figure 24:
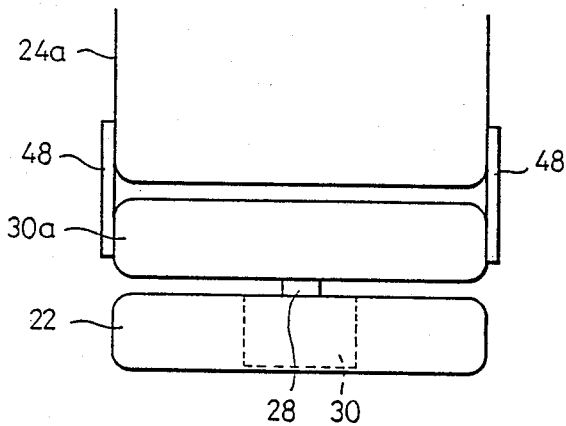
FIG. 24 is a view illustrating a modified seat of a vehicle in which the arrangement of the reclining adjusting device and the backrest support shaft is the reverse of that of FIG. 4.

FIGS. 3 and 4 show the details of the apparatus 30 for regulating the rotational movement of the backrest 24. The backrest 24 is represented by a frame member 24a and the apparatus 30 is mounted in a rigid housing 30a. This housing 30a of the apparatus 30 is supported on the seat cushion 22 through a conventional reclining adjusting mechanism 48 and rotatably supports the backrest 24 through the generally vertical support shaft 28, for rotation about the axis of the support shaft 28. Therefore, the backrest 24 is tiltable relative to the seat cushion 22, as for the conventional seat, and is rotatable about the support shaft 28. Alternatively, as shown in FIG. 24, the housing 30a of the rotational movement regulating apparatus 30 can be rotatably supported on the seat cushion 22 and the backrest 24 tiltably supported on the housing 30a of the rotational movement regulating apparatus 30 through the conventional reclining adjusting mechanism 48. Also, the rotational movement regulating apparatus 30 consists of a plurality of components, which are housed in the housing 30a in FIGS. 3 and 4, while such components are housed in the frame of the seat cushion 22 in FIG. 24.

Referring to FIGS. 3 and 4, the support shaft 28 is fixedly secured by the bottom wall of the housing 30a of the rotational movement regulating apparatus 30. The housing 30a has a circular opening 30b at the center of the top thereof and the support shaft 28 extends through this opening 30b. The frame member 24a of the backrest 24 is rotatably supported on the projected upper end of the support shaft 28. The frame member 24a of the backrest 24 has a guide pin 50 fixed to the bottom thereof and extending downwardly therefrom and in parallel to the support shaft 28. This guide pin 50 extends through the opening 30b into the housing 30a, and is designed to be engaged by an engaging means of the rotational movement regulating apparatus 30 and to be rotated together with the frame member 24a of the backrest 24 on a circle about the axis of the support shaft 28.

In the housing 30a of the rotational movement regulating apparatus 30, a pair of identical geared wheels 52 and 54 are rotatably secured on the support shaft 28 at axially spaced positions, and two electric motors 56 and 58 are fixedly secured to the bottom wall of the housing 30a at opposite positions from the support shaft 28. The motors 56 and 58 have respective output shafts 60 and 62 which extend upward and in parallel to the support shaft 28, and the upper ends thereof can be rotatably received by the top wall of the housing 30a or by other rotatable support means. Pinions 64 and 66 are fixedly secured on the respective output shafts 60 and 62 and are mated to the geared wheels 52 and 54, respectively. Further, angular position detecting devices 68 and 70 are provided to detect the angular positions of the motors 58 and 60, respectively.

Each geared wheel 52, 54 has an arcuate through-slot 72, 74 having an identical contour, and the guide pin 50, which extends downward from the bottom of the frame member 24a of the backrest 24, is inserted through these arcuate through-slots 72 and 74. Each arcuate through-slot 72, 74 has a certain circumferential length defined between end walls of the slot and the guide pin 50 is engaged by these end walls.

The operation of the rotational movement regulating apparatus 30, shown in FIGS. 3 and 4, is now described with reference to FIG. 5, which shows a top view of the guide pin 50 and the two registered geared wheels 52 and 54. Each of the geared wheels 52 and 54 can be driven by the electric motors 56 and 58 through the pinions 64 and 66, respectively. In this example, the support shaft 28, per se, does not rotate.

To retain the backrest 24 at the normal position, as shown in (A) of FIG. 2, the geared wheels 52 and 54 are immovably maintained at the normal position, as shown in (A) of FIG. 5. Namely, the guide pin 50 is immovably retained with the backrest 24 at the normal position. In (A) of FIG. 5, the top geared wheel 54 in FIG. 4 is turned in the anticlockwise direction until one circumferential end wall of the arcuate through-slot 74 engages with the guide pin 50 at that normal position, and similarly, the bottom geared wheel 52 is turned in the clockwise direction until one circumferential end wall of the arcuate through slot 72 engages with the guide pin 50 from the opposite side, and thus the guide pin 50 is pinched between the respective circumferential end walls of the arcuate through-slots 72 and 74 and immovably retained. Therefore, it is possible to immovably retain the backrest 24 at the normal position, as shown in (A) of FIG. 2, when the vehicle 10 is running in the forward direction.

When a free rotation of the backrest 24 is desired while the vehicle 10 is stopped or running in reverse, the top geared wheel 54 is turned in the clockwise direction and the bottom geared wheel 52 is turned in the anticlockwise direction, until the two arcuate through-slots 72 and 74 are completely superposed one over the other, as shown in (B) of FIG. 5. Therefore, the guide pin 50 can move freely within the range defined by the circumferential length of the arcuate through-slots 72 and 74, and thus the backrest 24 can be turned to a certain angular position by hand or by the pressure of the back of the driver, as shown in (C) of FIG. 5. After the backrest 24 is turned to the desired angular position, the geared wheels 52 and 54 are returned to the normal position, as shown in (A) of FIG. 2, by pushing the return switch 35. During the return movement of the geared wheels 52 and 54, either of the circumferential end walls of the arcuate through-slots 72 and 74 can draw the guide pin 50 back to the normal position, as shown in (D) of FIG. 5. Further, a selection of the angular range by the selecting knob 38 allows the geared wheels 52 and 54 to be disposed in such a manner that the arcuate through-slots 72 and 74 are brought into a position in which they are not completely superposed, as compared to (B) of FIG. 5, thus enabling the range of free rotation to be adjusted.

Figure 6A:
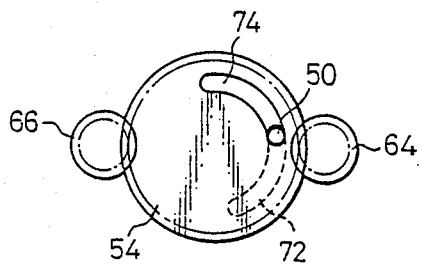
FIGS. 6A-6C are views further illustrating the operation of the apparatus of FIGS. 3 and 4.
Figure 6B:
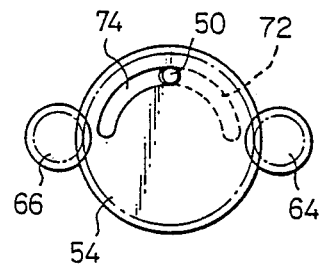
Figure 6C:
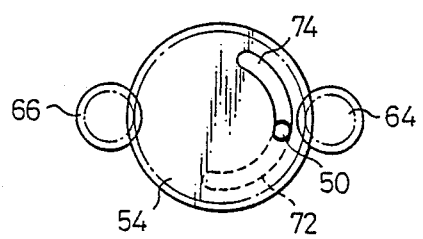

Further, as shown in FIG. 6, the position of the backrest 24 can be automatically controlled by moving the guide pin 50 In contrast to the reverse rotation of the geared wheels 52 and 54 to superpose the arcuate through-slots 72 and 74 as shown in (A) to (B) of FIG. 5, this is attained by rotating the geared wheels 52 and 54 together in the same direction while the guide pin 50 in pinched by the opposing circumferential end walls of the arcuate through-slots 72 and 74. With this operation, it is possible to rotate the backrest 24 by any desired angle. (A) of FIG. 6 illustrates the backrest 24 when turned fifteen degrees to the left, (B) when turned ninety degrees to the left, and (C) when turned fifteen degrees to the right. The signal from the manual switch 34 in FIG. 1 can be used for this rotation, and the position of the backrest 24 can be controlled by the electric control unit (ECU) 32 in response to the detected signals, as shown in FIG. 1.

Figure 7:
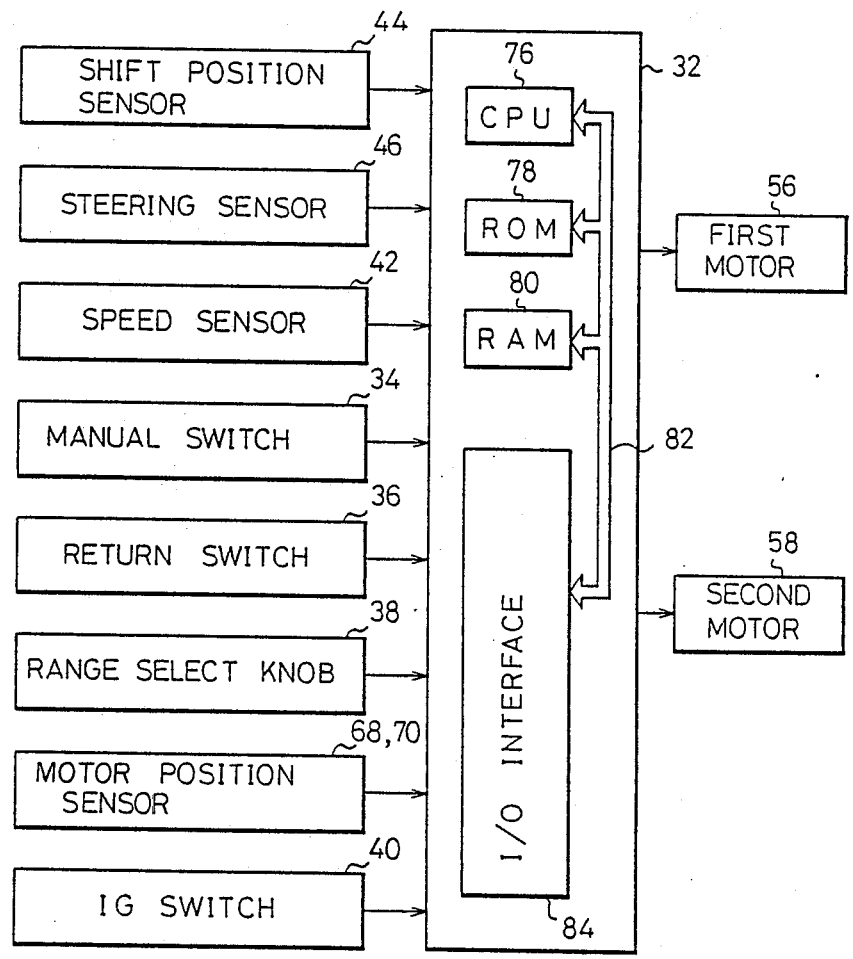
FIG. 7 is a view illustrating a general arrangement of the control unit of FIG. 1.

FIG. 7 illustrates a general arrangement of the control unit (ECU) 32. The ECU 32 is constituted by a microcomputer and comprises a central processing unit (CPU) 76 having arithmetic and control functions, a read only memory (ROM) 78 for storing the program, a random access memory (RAM) 80, and a bidirectional bus 82 interconnecting these units, which are also connected to the sensors and the electric motors 56 and 58 through an input and output interface 84.

Figure 8A:
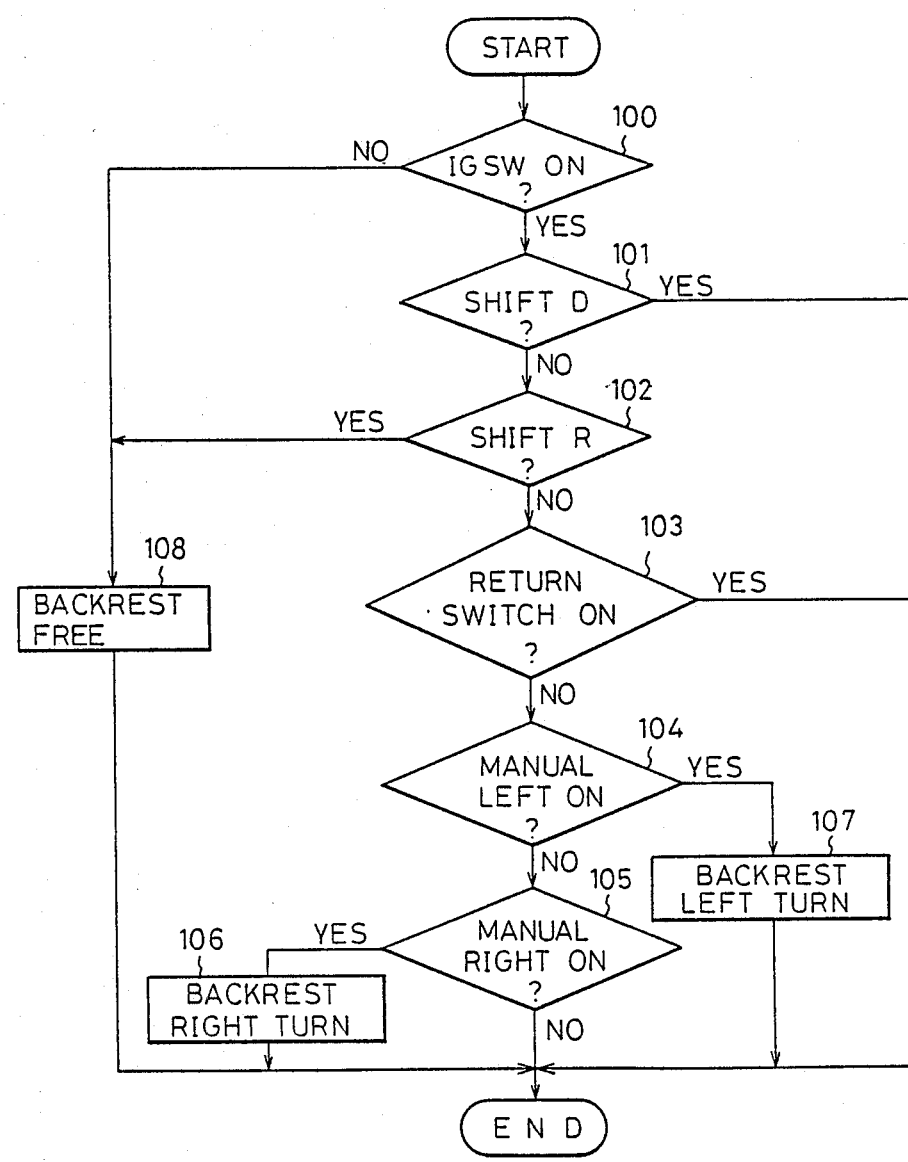
FIGS. 8A and 8B comprise a flow chart of the control of the angular position of the rotatable backrest in response to the driving state of the vehicle.
Figure 8B:
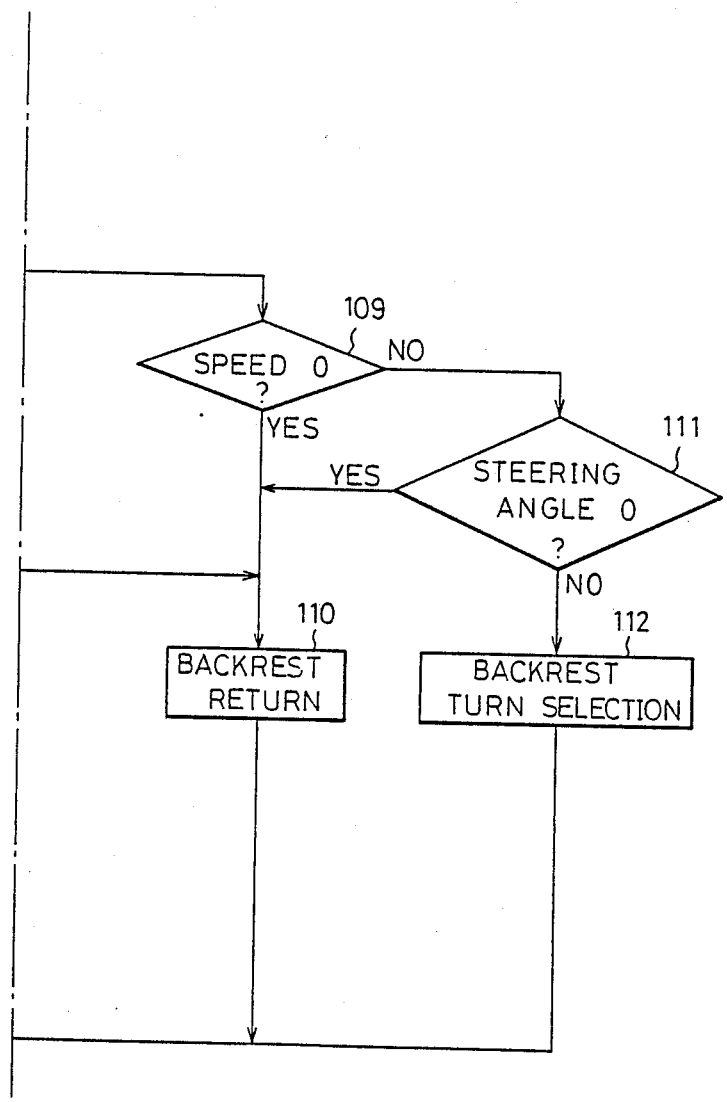
Figure 25:
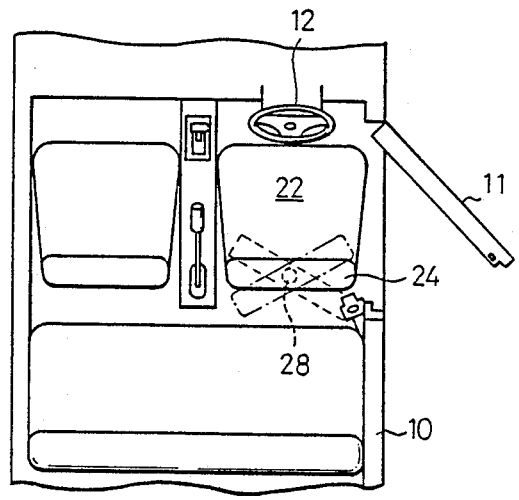
FIG. 25 is a view illustrating examples of the use of the vehicle seat with the rotatable backrest.

FIG. 8 is a flow chart of the control of the rotational movement regulating apparatus 30, executed according to the program stored in the ROM 78. This flow starts at predetermined time periods. At step 100, it is determined whether the ignition switch 40 is turned ON. If the result is YES, the ignition switch 40 is in the ON position and START position, and if the result is NO, the ignition switch 40 is at the ACC (accessory) position and LOCK position. If the result is NO, the program goes to step 108 and the backrest 24 is then freely rotatable. This free rotatable state of the backrest 24 is that shown in (B) of FIG. 5. The backrest 24 thus can be rotated to a position indicated by the dashed line in FIG. 25 to allow easy access to and exit from the vehicle 10 in connection with the door 11. Also, it is possible to rotate the backrest 24 to a position indicated by the dash-dot line in FIG. 25 to reach and/or load baggage on the rear seat without moving the front seat backwards or forwards. It is also possible to enter to the rear seat in this state.

If the result at step 100 is YES, the program goes to step 101 and it is determined whether the transmission shift lever 20 is at the D (drive) position. If the result is YES, the program then goes to step 109 or to step 102 if the result is NO. At step 102, it is determined whether the transmission shift lever 20 is at the R (reverse) position. If the result is YES, the program goes to step 108 and the backrest 24 is then freely rotatable. Therefore, the driver can rotate the backrest 24 by pressure of the back when wishing to see behind the vehicle, and thus easily obtain a view of the rear of the vehicle.

When the reverse movement of the vehicle is completed and is followed by a forward, the result at step 101 becomes YES and the program goes to step 109 and then step 110, to return the backrest 24 to the normal position, as shown in (A) of FIG. 5.

When the result is NO at both steps 101 and 102, the shift lever 20 is at the N (neutral) position or P (park) position. In this case, the backrest 24 can be rotated in response to signals from the manual switch 34, which is located in the driver's compartment near the side of the vehicle so that it can be operated not only by the driver but also by a person outside of the vehicle 10 when wishing to load baggage. In this flow chart, at step 103, it is determined whether the manual return switch 36 is switched ON, and if the result is NO at step 103, then the program goes to step 104. At step 104, it is determined whether the left turn button of the switch 34 is ON. If the result is YES, the program goes to step 107 to allow a left turn of the backrest 24. When the result at step 104 is NO, the program goes to step 105 to determine whether the right turn button of the manual switch 34 is ON. If the result is YES, the program goes to step 106 to allow a right turn of the backrest 24. In this way, the backrest 24 can be rotated in response to signals from the manual switch 34. The program goes to step 110 through step 103, to return the backrest 24 to the normal position, when the manual return switch 36 is turned ON. In addition, the backrest 24 is automatically returned to the normal position even if the manual return switch is not turned ON, because the program passes through steps 109 and 110 when the transmission shift lever 22 is moved to the D (drive) position.

If the transmission shift lever 22 is at the D position and the speed of the vehicle 10 is not zero, that is, when the vehicle is moving in the forward direction, the backrest 24 is usually maintained at the normal position. However, in the illustrated preferred embodiment, the backrest 24 can be further rotated by selected angles to firmly hold the body against centrifugal force generated when the vehicle is cornering during the forward running. For this purpose at step 109 it is determined whether or not the speed of the vehicle is zero. The program goes to step 110 to bring the backrest 24 to the normal position when the speed is zero, and goes to step 111 when the speed is not zero. Whether or not the steering angle detected by the steering sensor 46 is zero is determined at step 111. The program goes to step 110 again to bring the backrest 24 to the normal position when the steering angle is zero, and goes to step 112 to bring the backrest 24 to a selected angular position when the steering angle is not zero. The embodiment uses zero as a reference value at both steps 109 and 111, but it is possible to preselect other reference values greater than zero.

Figure 9:
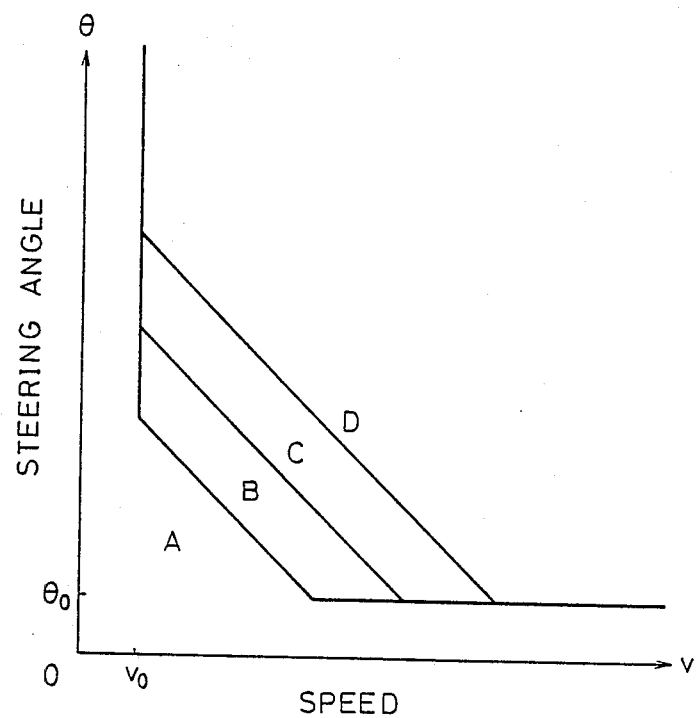
FIG. 9 is a graphical view illustrating the rotating angular range of the backrest when defined relative to the speed and the steering angle of the vehicle.

In this embodiment, the angle of the backrest 24 at step 112 can be determined from a two dimensional map, as a function of the speed and the steering angle, stored as shown in FIG. 9. The selectable angle varies at four regions, represented by A, B, C, and D. The selectable angle becomes greater in the order of the regions B, C, D, in which the speed is greater than $v_0$ and the steering angle is greater than $\theta_0$. In the region A, both the speed and the steering angle are small, so that the centrifugal force at cornering is small, and thus it is not necessary to rotate the backrest 24 and the backrest 24 is retained at the normal position. These reference values $v_0$ and $\theta_0$ can be used as reference values at steps 109 and 111.

Figure 10:
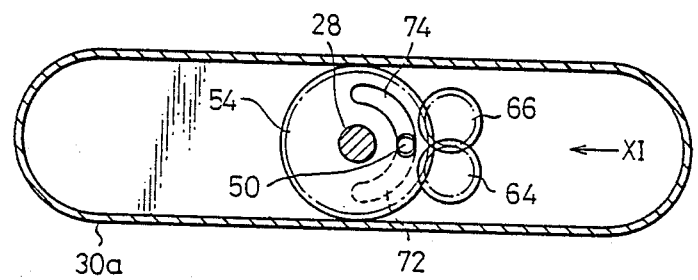
FIG. 10 is a view similar to FIG. 3 but illustrating a second embodiment of the rotational movement regulating apparatus for the seat of a vehicle.
Figure 11:
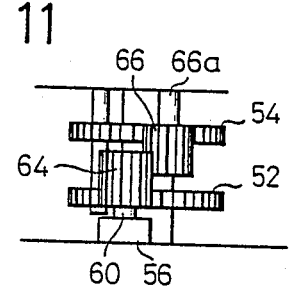
FIG. 11 is a side elevational view of the apparatus of FIG. 10 as seen in the direction of the arrow XI in FIG. 10.
Figure 12:
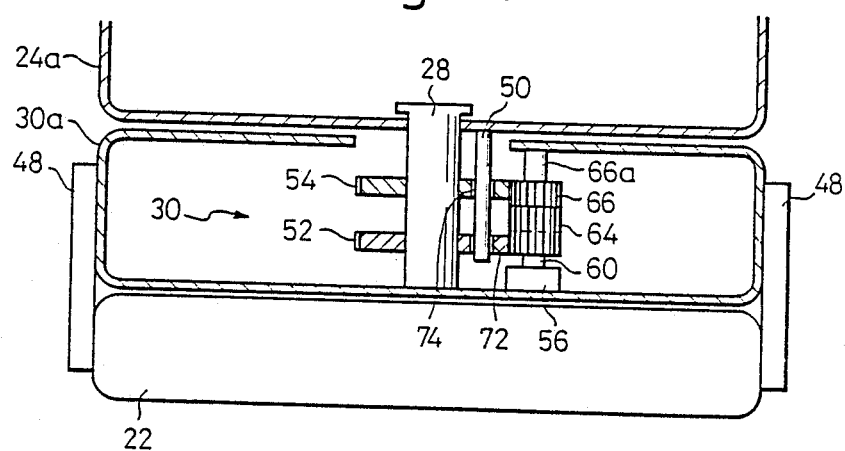
FIG. 12 is a cross-sectional view of the apparatus of FIG. 10.
Figure 13A:
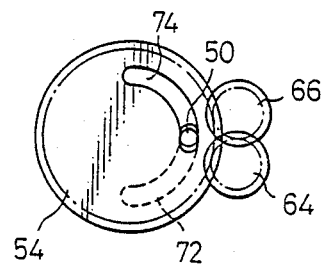
FIGS. 13A-13E are views illustrating the operation of the apparatus of FIGS. 10 to 12.
Figure 13B:
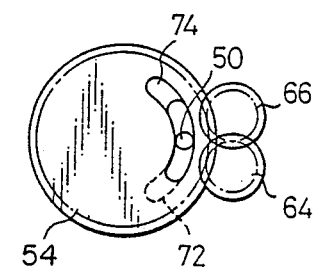
Figure 13C:
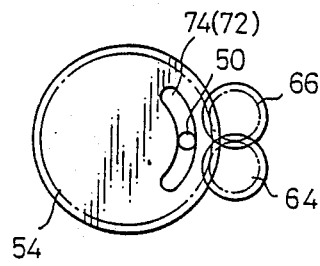
Figure 13D:
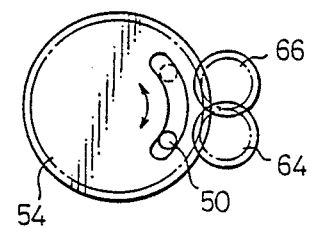
Figure 13E:
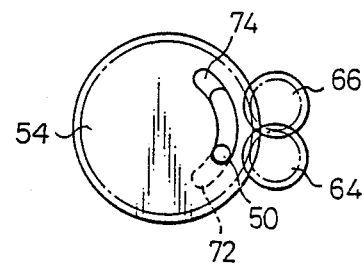

FIGS. 10 to 12 illustrate a second embodiment of the rotational angle regulating apparatus 30 for the backrest 24. In this embodiment also, the support shaft 28 rotatably holds a pair of geared wheels 52 and 54 having the arcuate through-slots 72 and 74, and the guide pin 50 is fixed to the frame member 24a of the apparatus 30. However, only electric motor 56 is provided, having the output shaft 60 with the pinion 64. A further shaft 66a is provided in parallel to the output shaft 60 of the motor 56, another pinion 66 being mounted on this shaft 66a. These pinions 64, 66 have a relatively large thickness, respectively, and are partially mated with each other along the thickness. In addition, the pinion 64 is mated with the bottom geared wheel 52 and the other pinion 66 is mated with the top geared wheel 54. Since the pinions 64, 66 are mated with each other, the geared wheels 52 and 54 rotate in reverse directions when the motor 56 is driven.

The operation of the apparatus 30 in FIGS. 10 to 12 is also described with reference to FIG. 13.

As shown in (A) of FIG. 13, the two geared wheels 52 and 54 can be retained in the position in which the end walls of the arcuate through-slots 72 and 74 pinch the guide pin 50 and the backrest 24 is immovably retained at the normal position. From this position, as shown in (B) and (C) of FIG. 13, the two geared wheels 52 and 54 can be rotated so that the arcuate through-slots 72 and 74 are superposed one above the other. The guide pin 50 can then move freely within the range of the arcuate through-slots 72 and 74, enabling the backrest 24 to freely rotate to ensure a good rear view position when the vehicle is in reverse or to facilitate the entrance and exit and loading and unloading of baggage. Then, as shown in (E) of FIG. 13, the guide pin 50 can be returned by driving the two geared wheels 52 and 54 in reverse directions, so that the end walls of the arcuate through-slots 72 and 74 are moved toward each other.

Figure 14:
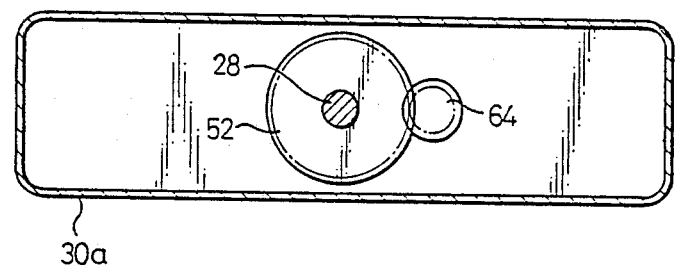
FIG. 14 is a view similar to FIG. 10 but illustrating a third embodiment of the rotational movement regulating apparatus for the seat of a vehicle.
Figure 15:
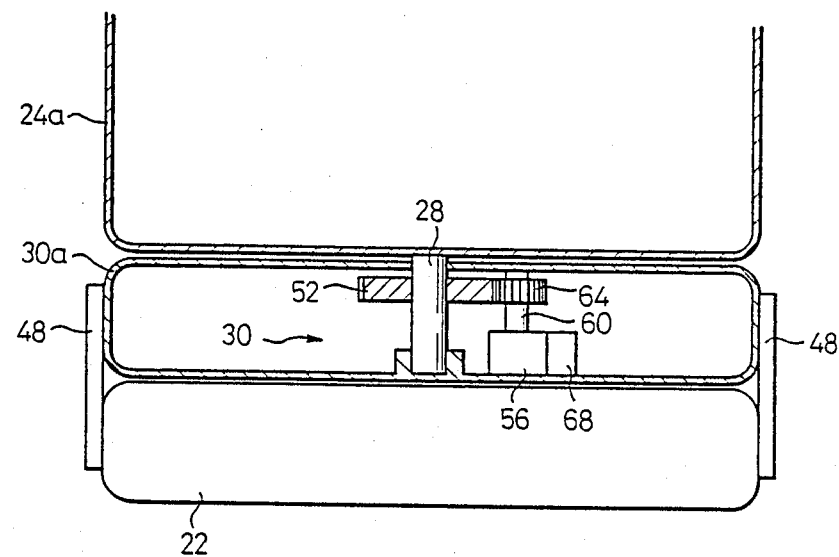
FIG. 15 is a cross-sectional view of the apparatus of FIG. 14.

FIGS. 14 and 15 illustrate a third embodiment of the rotational angle regulating apparatus 30 for the backrest 24. In this embodiment, the support shaft 28 is rotatably supported in a boss provided in the bottom wall of the housing 30a of the apparatus 30 and the upper end fixedly supports the frame member 24a of the backrest 24. In addition, the support shaft 28 is provided with the geared wheel 52 fixedly secured thereto, which is mated with the pinion 64 on the output shaft 60 of the electric motor 56. The angular position detector 68 is also provided to detect the position of the motor 56. In this embodiment, the backrest 24 rotates together with the support shaft 28. The motor 56 can be controlled to hold the backrest 24 at the normal position and bring it to a desired position in response to the state of the vehicle 10.

Figure 16:
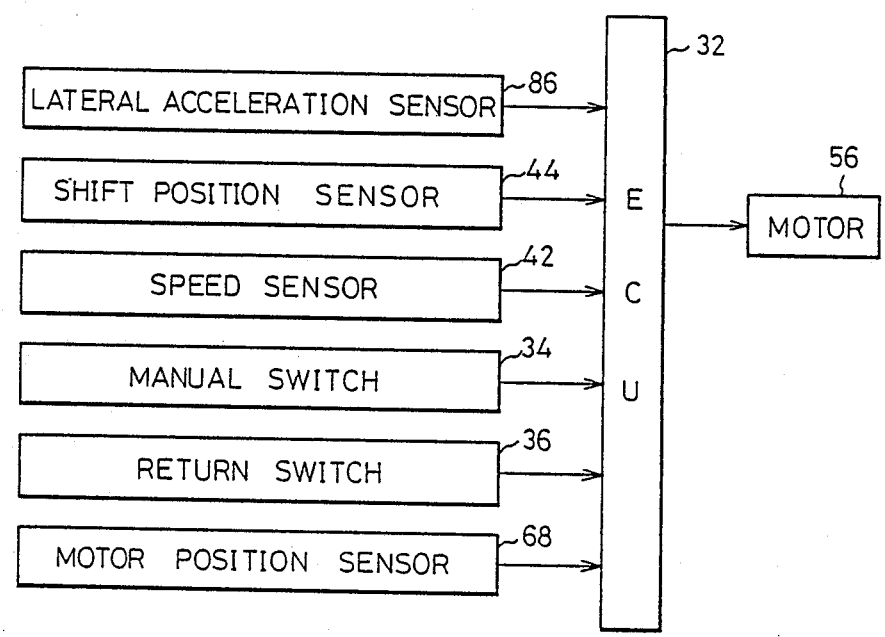
FIG. 16 is a view similar to FIG. 7 but illustrating an arrangement of the control unit using a lateral acceleration sensor.

FIG. 16 illustrates another example of the electric control unit (ECU) 32, which can control, for example, the motor 56 in FIGS. 14 and 15. This ECU 32 also can be constituted by a microcomputer. Although the ECU in FIG. 7 receives the output from the steering sensor 46 to move the backrest 24 to a selected angle during cornering of the vehicle 10, the ECU 32 in FIG. 16 receives the output from the lateral acceleration sensor 86 for directly detecting a lateral acceleration during cornering of the vehicle 10.

Figure 17:
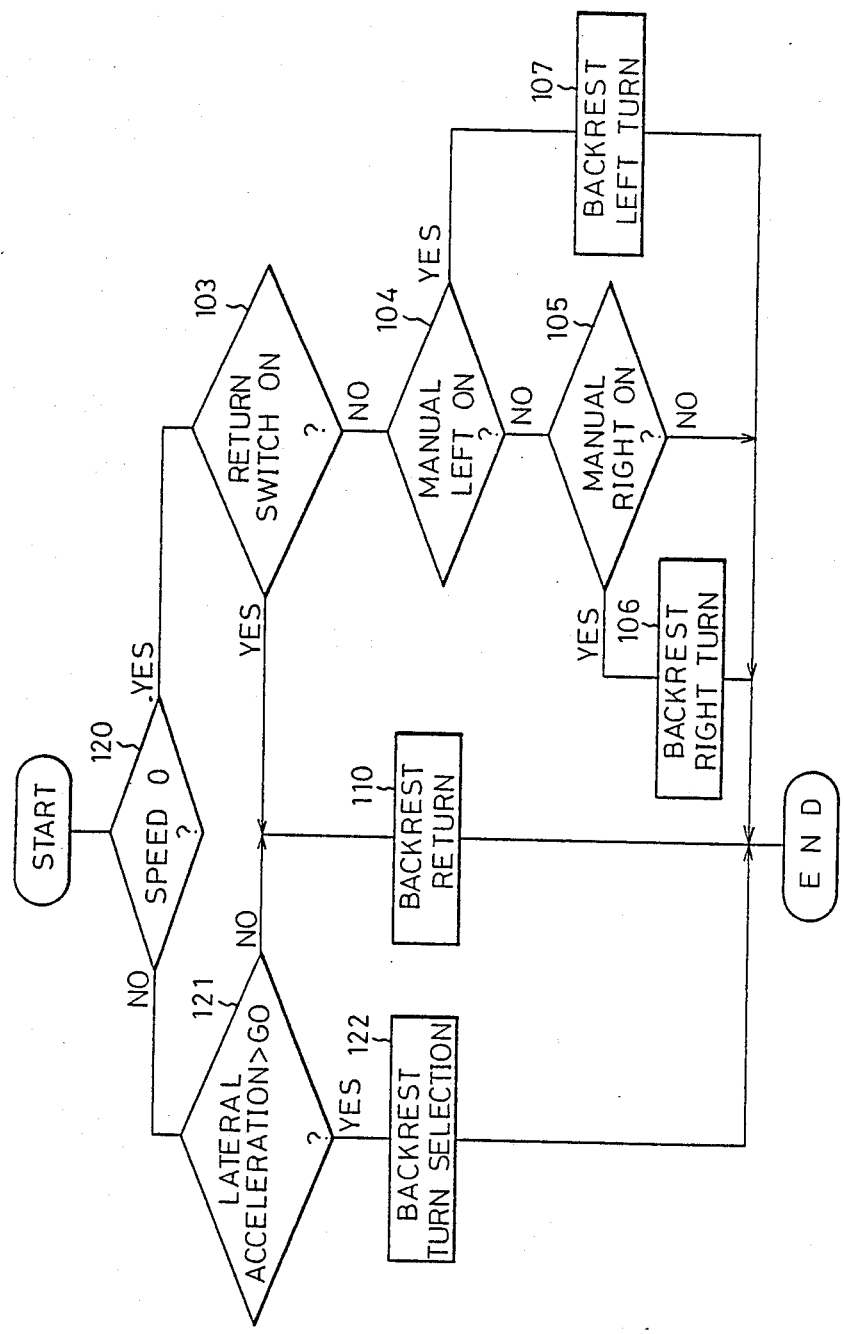
FIG. 17 is a flow chart of the control of the angular position of the rotatable backrest using the lateral acceleration sensor.

FIG. 17 illustrates a flow chart for the position control of the backrest 24 using the output from the lateral acceleration sensor 86. At step 120, it is determined whether the speed of the vehicle 10 is zero. If the result is YES, the program goes to step 103, but if the result is NO, goes to step 121. It will be understood that steps 103 to 110 correspond to steps 103 to 110 in FIG. 8 and thus a repeated description thereof is omitted here. At step 121, the lateral acceleration detected by the lateral acceleration sensor 86 is compared with a predetermined reference value $G_0$, to detect whether the lateral acceleration of the vehicle 10 is sufficient to affect the driver's body. If the result is YES, the backrest 24 is rotated by a proper angle. If the result is NO, the program goes to step 110 and the backrest 24 is retained at the normal position.

Figure 18:
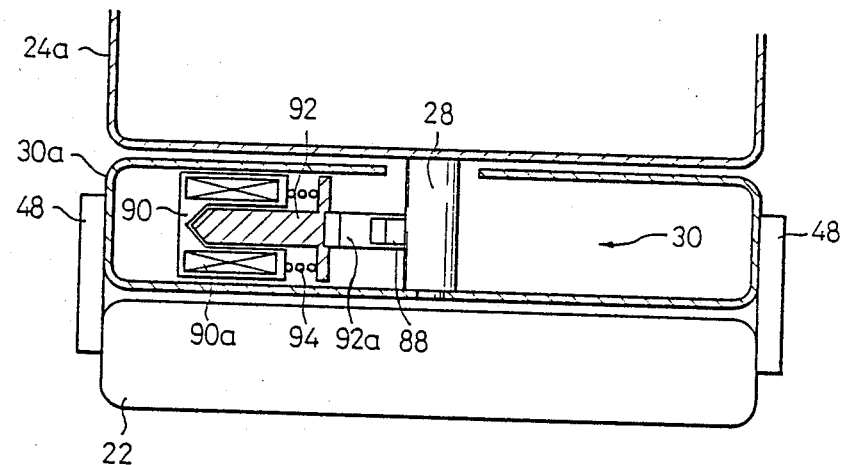
FIG. 18 is a view illustrating a fourth embodiment of the rotational movement regulating apparatus for the seat of a vehicle.
Figure 19A:
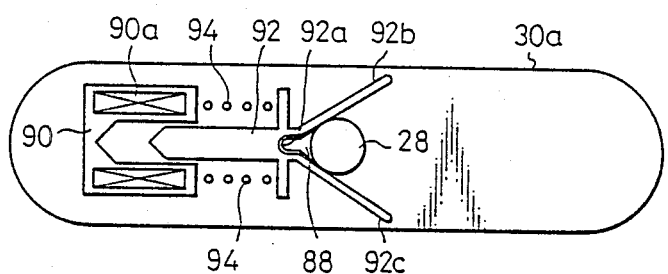
FIGS. 19A-19C are schematic cross-sectional views of the apparatus of FIG. 18 under various operating conditions.
Figure 19B:
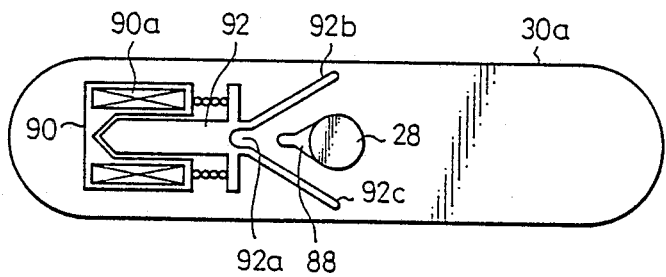
Figure 19C:
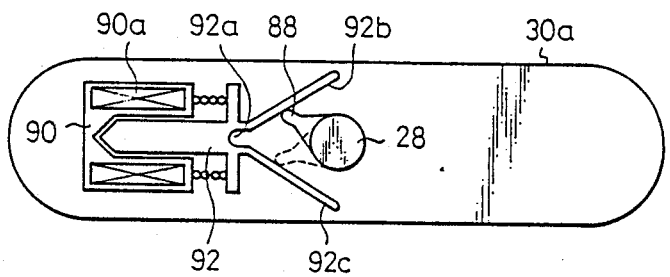

FIGS. 18 and 19 illustrate a fourth embodiment of the rotational angle regulating apparatus 30 for the backrest 24. In this embodiment, the support shaft 28 is rotatably supported in a hole provided in the bottom wall of the housing 30a of the apparatus 30 and fixedly supports the frame member 24a of the backrest 24.

The support shaft 28 is provided with a laterally protruding detent projection 88 at an intermediate portion thereof. The rotational angle regulating apparatus 30 comprises a solenoid operated actuator 90 having a solenoid 90a. Note, other actuating means such as a fluid pressure actuator can be used. An engaging rod 92 is located on a radius line extending through the axis of the support shaft 28 and one end thereof faces the support shaft 28. The other end of the engaging rod 92 is axially inserted in the solenoid 90a. A spring 94 biases the engaging rod 92 toward the support shaft 28 and the solenoid 90a can pull the engaging rod 92 away from the support shaft 28 against the spring 94. A notch 92a, complementary to the detect projection 88 of the support shaft 28, is formed on the end of the engaging rod 92 facing the support shaft 28.

Therefore, when the engaging rod 92 is pushed against the support shaft 28 by the spring 94, the detect projection 88 is fitted in the notch 92a so that the support shaft 28 is immovably retained, as shown in (A) of FIG. 19. In this situation, the backrest 24 is retained at the normal position.

As shown in (B) of FIG. 19, when the solenoid 90a is energized, the engaging rod 92 is pulled and the detent projection 88 is released from the notch 92a, so that the support shaft 28 can freely rotate together with the backrest 24.

A pair of ribs 92b and 92c divergently extend toward the support shaft 28 on either side of the notch 92a. Therefore, as shown in (C) of FIG. 19, the detent projection 88 of the support shaft 28 can freely rotate within a predetermined range restricted by the ribs 92b and 92c when the support shaft 28 is released from the engaging rod 92.

Figure 20:
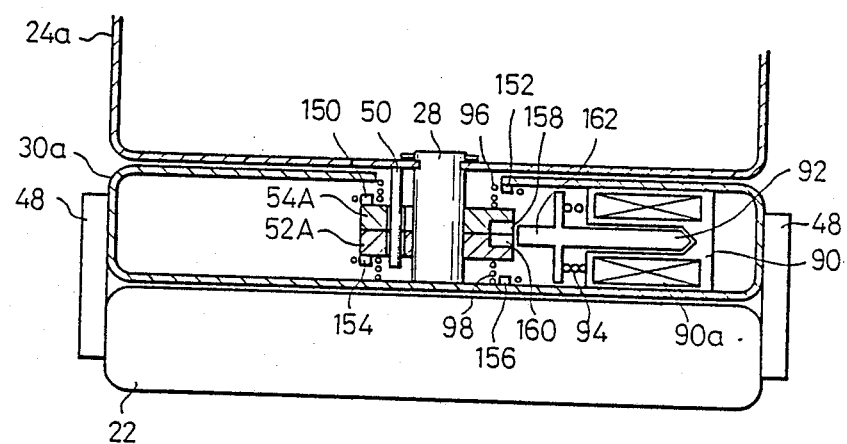
FIG. 20 is a view illustrating a fifth embodiment of the rotational movement regulating apparatus for the seat of a vehicle.
Figure 21A:
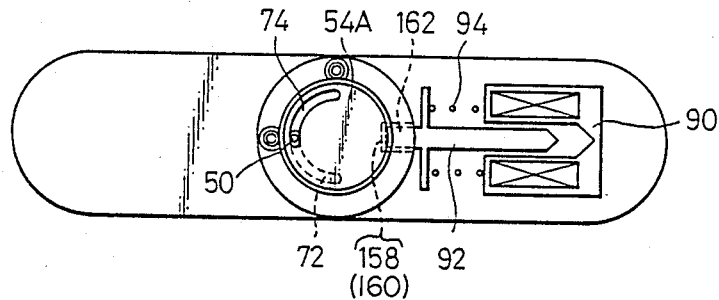
FIGS. 21A-21C are schematic cross-sectional views of the apparatus of FIG. 20 under various operating conditions.
Figure 21B:
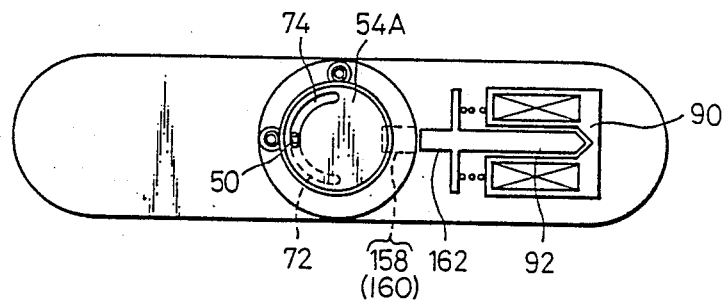
Figure 21C:
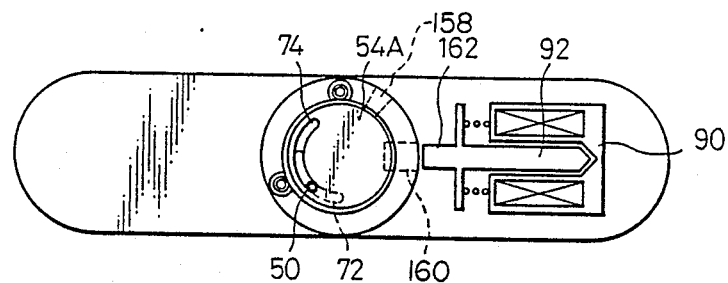

FIGS. 20 and 21 illustrate a fifth embodiment of the rotational angle regulating apparatus 30 for the backrest 24. Similar to the embodiment of FIGS. 3 and 4, in this embodiment, the support shaft 28 rotatably supports the frame member 24a of the backrest 24 and the guide pin 50 secured on the frame member 24a of the backrest 24 is inserted through the arcuate through-slots 72 and 74 (FIG. 21). However, although the arcuate through slots 72 and 74 are provided in the motor driven geared wheels 52 and 54, in this embodiment, the arcuate through-slots 72 and 74 are formed in the gear wheels 52A and 54A which are rotatably secured on the support shaft 28.

These wheels 52A and 54A are biased by return springs 96 and 98, respectively. One end of the return springs 96 is fixed to a hook 150 of the top wheel 54A, and the other end is fixed to a hook 152 on the top wall of the housing 30a. One end of the other return spring 98 is fixed to a hook 154 of the bottom wheel 52A, and the other end is fixed to a hook 156 on the bottom wall of the housing 30a. These return springs 96 and 98 counter balance each other to retain the guide pin 50 when the backrest 24 is at the normal position, and return the backrest 24 to the normal position when the backrest 24 is in a rotated position such as, for example, shown in (C) of FIG. 21.

Further, provided on the circumferences of these wheels 52A and 54A are registrable notches 158 and 160, diametrically opposite the arcuate through-slots 72 and 74. These notches 158 and 160 are cooperable and can be brought into a consecutive unit notch form when the respective ends of the arcuate through-slots 72 and 74 pinch the guide pin 50, as shown in (A) of FIG. 21. An end projection 162 of the engaging rod 92 can be fitted in this consecutive unit notch, and the two wheels 52A and 54A are locked to immovably retain the backrest 24 at the normal position when the end projection 162 of the engaging rod 92 is fitted in this consecutive unit notch.

The engaging rod 92 is arranged on a radius line extending through the axis of the support shaft 28, and is moved by a solenoid operated actuator 90 similar to that shown in FIG. 18. Note, other actuating means such as a fluid pressure actuator can be used.

Figure 22:
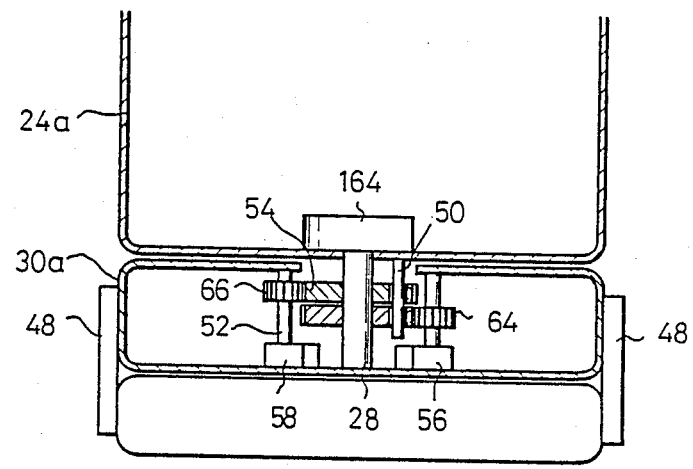
FIG. 22 is a modified embodiment of the rotational movement regulating apparatus for the seat of FIG. 4.
Figure 23:
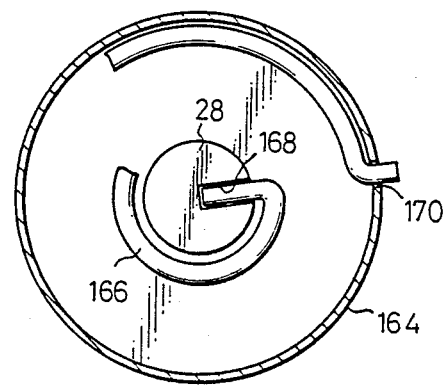
FIG. 23 is a view illustrating the inside of the spring box of FIG. 22.

FIG. 22 illustrates a modification of the embodiment shown in FIGS. 3 and 4. This embodiment is provided with a spring box 164 in addition to the arrangement in FIGS. 3 and 4. The spring box 164 is fixed to the frame member 24a of the backrest 24 over the support shaft 28. As shown in FIG. 23, a coil spring 166 is housed in the spring box 164, and the inner end of the coil spring 166 is secured in a securing hole 168 provided in the upper end portion of the support shaft 28, and the outer end is secured in a securing hole 170 of the spring box 164. This coil spring 166 acts to assist the return of the backrest 24 from the freely rotatable position to the normal position. Such a return spring, together with the arrangement in which the backrest 24 can freely rotate when the vehicle 10 is reversing, may provide the driver with a feeling of greater safety, since the backrest 24 naturally and fittingly moves together with the driver's body.

As will become apparent from the above description, the vehicle seat with the rotatable backrest, according to the present invention, allows the backrest only to rotate relative to the seat cushion and thus reduces the spacial restrictions when mounting the seat in the vehicle, compared to the case wherein the seat proper rotates, resulting in an increase in the applicability of a rotatable seat in the vehicle. Also, the backrest can rotate relative to the seat cushion but the rotational movement of the backrest is regulated in response to the state of the vehicle, so that many advantages, for example, in the action of the driver and in access to the rear seat can be obtained which might not otherwise be obtained by a seat with a rotatable cushion

We claim:

1. A seat mounted in a vehicle having an operational state indicative of at least one of an operating condition of said vehicle and a condition of said vehicle relative to a surrounding environment, comprising:
   a seat cushion for seating a person in said vehicle,
   a support shaft projecting upward with respect to said seat cushion and having an axis,
   a backrest secured on said support shaft for rotation with respect to said seat cushion about said axis,
   means for regulating the rotational movement of said backrest,
   means for detecting at least one of the operating condition of said vehicle and the condition of said vehicle relative to the surrounding environment, and
   control means for controlling said regulating means in response to said at least one detected condition of said vehicle.

2. A seat according to claim 1, wherein said detecting means comprises a shift position detecting means for detecting a position of a transmission shift lever and speed detecting means for detecting a speed of said vehicle, said rotational movement regulating means being arranged such that said backrest is immovably retained at a predetermined angular position relative to said seat cushion at least when said shift lever is in a forward drive position and said vehicle is not moving.

3. A seat according to claim 2, wherein said rotational movement regulating means is arranged such that said backrest is allowed to freely rotate within a predetermined angle relative to said seat cushion when said shift lever is in a reverse drive position.

4. A seat according to claim 2, wherein said rotational movement regulating means is arranged such that said backrest is allowed to freely rotate within a predetermined range relative to said seat cushion when a non-operating state of said vehicle is detected.

5. A seat according to claim 2, wherein said vehicle has a manual switch adapted to output a rotation indicating signal and said detecting means further comprises means for detecting whether said rotation indicating signal is output, and wherein said rotational movement regulating means is arranged such that said backrest is caused to rotate in the desired direction relative to said seat cushion when the stopped state of said vehicle and the output of said rotation indicating signal from said manual switch are detected.

6. A seat according to claim 2, wherein said detecting means further comprises a steering angle sensor for detecting a steering angle of said vehicle, and wherein said rotational movement regulating means is arranged such that said backrest is caused to rotate by a predetermined angle relative to said seat cushion when said shift lever is in a forward drive position and said vehicle is moving and said steering angle is greater than a predetermined value.

7. A seat according to claim 2, wherein said detecting means further comprises a lateral acceleration sensor for detecting a lateral acceleration of said vehicle, and wherein said rotational movement regulating means is arranged such that said backrest is caused to rotate by a predetermined angle relative to said seat cushion when said shift lever is in a forward drive position and said vehicle is moving and said lateral acceleration is greater than a predetermined value.

8. A seat according to claim 2, wherein said rotational movement regulating means comprises engaging means adapted to engage with one of said support shaft and said backrest to regulate rotational movement of said backrest, and drive means adapted to be controlled by said control means so as to drive said engaging means.

9. A seat according to claim 8, wherein said support shaft is rotatably mounted at said seat cushion and fixedly supports said backrest, said engaging means of said rotational movement regulating means engaging with said rotatable support shaft.

10. A seat according to claim 9, wherein said engaging means is arranged such that said support shaft is releasably engaged therewith, whereby said rotational movement regulating means immovably retains said backrest at said predetermined angular position when said engaging means is engaged with said support shaft and allows said backrest to freely rotate within a predetermined range when said engaging means is released from said support shaft.

11. A seat according to claim 10, wherein said support shaft has at least one of a detent projection and a notch and said engaging means includes an engaging member movable to and from said support shaft on a radius line extending toward said axis of said support shaft, said engaging member having at least one of a notch and a detent projection complementary to said at least one detent or notch of said support shaft, said drive means linearly driving said engaging member on said radius line to bring said engaging member into engagement with or release from said support shaft.

12. A seat according to claim 11, wherein said support shaft has a detent projection and said engaging member has a complementary notch with a pair of ribs extending toward said support shaft on either side of said notch, whereby said detent projection of said support shaft can freely rotate within a predetermined range restricted by said ribs when said support shaft is released from said engaging member.

13. A seat according to claim 12, wherein said ribs divergently extend from the side of said notch toward said support shaft.

14. A seat according to claim 13, wherein said drive means comprises a solenoid operated actuator.

15. A seat according to claim 8, wherein said engaging means comprises a geared wheel fixedly secured on said support shaft, said drive means comprises an electric motor drivingly connected to said geared wheel, and said detecting means includes an angular position sensor for detecting the angular position of said electric motor, whereby said engaging means can bring said backrest to various angular positions under the control of said control means and said electric motor is immovably retained at a predetermined angular position when said shift lever is in a forward drive position.

16. A seat according to claim 15, wherein said detecting means further includes a steering sensor for detecting the steering angle, whereby said control means can control said electric motor to immovably retain said backrest at a predetermined angular position when said shift lever is in a forward drive position and further driven to rotate said backrest by a controlled angle relative to said seat cushion when the steering angle is greater than a predetermined value.

17. A seat according to claim 15, wherein said detecting means further includes a lateral acceleration sensor for detecting the lateral acceleration applied to said vehicle, whereby said control means can control said electric motor to immovably retain said backrest at a predetermined angular position when said shift lever is in a forward drive position and further driven to rotate said backrest by a controlled angle relative to said seat cushion when the lateral acceleration is greater than a predetermined value.

18. A seat according to claim 8, wherein spring means is provided to bias said backrest to return toward said predetermined angular position.

19. A seat according to claim 8, wherein said support shaft rotatably supports said backrest and said rotational movement regulating means engages with said backrest to regulate the rotational movement of said backrest.

20. A seat according to claim 19, wherein said backrest has a guide pin extending parallel to said support shaft and said engaging means comprises a pair of identical engaging wheels rotatably mounted on said support shaft at axially spaced positions and each wheel has an arcuate through-slot identical to that of the other wheel, said guide pin being inserted through said arcuate through-slot of each wheel, said engaging wheels being able to be driven to positions such that said guide pin is pinched by one end of each of said arcuate through-slot to thereby retain said backrest at said predetermined angular position.

21. A seat according to claim 20, wherein said pair of engaging wheels comprises geared wheels and said drive means comprises electric motor means drivingly connected to said geared wheels.

22. A seat according to claim 21, wherein said pair of engaging wheels can be synchronously driven while maintaining said guide pin in a state pinched by said respective one end of each of said arcuate through-slots to thereby draw said backrest to a desired angular position.

23. A seat according to claim 22, wherein said pair of engaging wheels can be driven from a first position in which said respective one end of each of said arcuate through-slots pinch said guide pin, to a second position in which said arcuate through-slots are superimposed one over the other and thus a clearance can be formed between said guide pin and said one end of each of said arcuate through-slots to allow the backrest to freely rotate, within a predetermined angular extent as defined by a circumferential length of said arcuate through-slots at said second position.

24. A seat according to claim 22, wherein said pair of wheels can be driven from a first position in which said respective one end of each of said arcuate through-slots pinch said guide pin, to a second position in which said arcuate through-slots are superimposed one over the other and thus a clearance can be formed between said guide pin and said one end of each of said arcuate through-slots, said backrest being further able to be drawn to a desired position by said guide pin engaged by one of said ends of each of said arcuate through-slots.

25. A seat according to claim 20, wherein each of said engaging wheels are drivingly connected to separate driving means, respectively.

26. A seat according to claim 20, wherein each of said engaging wheels are drivingly connected to common driving means to rotate in a reverse direction with respect to each other.

27. A seat according to claim 22 or 24, wherein said detecting means further includes a steering sensor for detecting the steering angle, whereby said electric motor means causes said pair of engaging wheels to pinch said guide pin by said respective one end of each of said arcuate through-slots to retain said backrest at a constant angular position when said shift lever is in a forward drive position and further to rotate said backrest by a controlled angle relative to said seat cushion when the steering angle is greater than a predetermined value.

28. A seat according to claim 22 or 24, wherein said detecting means further includes a lateral acceleration sensor for detecting the lateral acceleration applied to said vehicle, whereby said electric motor means drives said pair of engaging wheels to cause said guide pin to be pinched by said respective one end of each of said arcuate through-slots to retain said backrest at a constant angular position when said shift lever is in a forward drive position and further to rotate said backrest by a controlled angle relative to said seat cushion when said lateral acceleration is greater than a predetermined value.

29. A seat according to claim 20, wherein said pair of engaging wheels have on the circumference thereof at least one of registrable detent projections and notches which can be brought into a consecutive unit when said respective one end of each of said arcuate through-slots pinch said guide pin, and said engaging means includes an engaging member movable to and from said support shaft on a radius line extending toward said axis of said support shaft, said engaging member having at least one of a notch and a detent projection complementary to said at least one detent or notch of said wheels, said drive means linearly driving said engaging member of said radius line to bring said engaging member into engagement with or release from said wheels.

30. A seat according to claim 29, wherein said drive means comprises a solenoid operated actuator.

31. A seat mounted in a vehicle having an operational state indicative of at least one of an operating condition of said vehicle and a condition of said vehicle relative to a surrounding environment, comprising:
 a seat cushion for seating a person in said vehicle,
 a support shaft projecting upward with respect to said seat cushion and having an axis,
 a backrest secured on said support shaft for rotation with respect to said seat cushion about said axis,
 a reclining adjusting mechanism for tiltably supporting said backrest relative to said seat cushion,
 means for regulating the rotational movement of said backrest,
 means for detecting at least one of the operating condition of said vehicle and the condition of said vehicle relative to the surrounding environment, and
 control means for controlling said regulatory means in response to said at least one detected condition of said vehicle.

32. A seat according to claim 1, wherein said detecting means includes
 speed detecting means for detecting the speed of said vehicle, and cornering detecting means for detecting a lateral acceleration of said vehicle when said vehicle is cornering, said control means being further responsive to said speed and cornering detecting means for controlling said regulating means so that said backrest is rotated to a selected angular position relative to said seat cushion to resist a detected lateral acceleration applied to said person during cornering of said vehicle.

* * * * *